C11352744B2

United States Patent
Obana

(10) Patent No.: US 11,352,744 B2
(45) Date of Patent: Jun. 7, 2022

(54) RUBBER COMPONENT REINFORCING-STEEL CORD

(71) Applicant: BRIDGESTONE CORPORATION, Tokyo (JP)

(72) Inventor: Naohiko Obana, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 219 days.

(21) Appl. No.: 16/728,125

(22) Filed: Dec. 27, 2019

(65) Prior Publication Data
US 2020/0131699 A1  Apr. 30, 2020

Related U.S. Application Data

(63) Continuation of application No. PCT/JP2018/024702, filed on Jun. 28, 2018.

(30) Foreign Application Priority Data

Jun. 30, 2017  (JP) .............................. JP2017-129979

(51) Int. Cl.
*D07B 1/06* (2006.01)
*B65G 15/36* (2006.01)

(52) U.S. Cl.
CPC ............ *D07B 1/0613* (2013.01); *B65G 15/36* (2013.01); *D07B 1/0633* (2013.01);
(Continued)

(58) Field of Classification Search
CPC .... D07B 1/0613; D07B 1/162; D07B 1/0666; D07B 1/0673; D07B 1/068; D07B 1/0693; D07B 2201/2037

See application file for complete search history.

(56) References Cited

U.S. PATENT DOCUMENTS

| 4,143,209 A | 3/1979 | Gerspacher et al. |
| 5,806,296 A * | 9/1998 | Kaneko ................ D07B 1/0633 57/206 |

(Continued)

FOREIGN PATENT DOCUMENTS

| CN | 1208793 A | 2/1999 |
| CN | 1325800 A | 12/2001 |

(Continued)

OTHER PUBLICATIONS

Communication dated Jan. 28, 2021, from the European Patent Office in European Application No. 18822739.1.

(Continued)

*Primary Examiner* — Shaun R Hurley
(74) *Attorney, Agent, or Firm* — Sughrue Mion, PLLC

(57) ABSTRACT

Rubber article-reinforcing steel cord in which corrosion resistance is improved without an increase in weight. In a rubber article-reinforcing steel cord (1), plural sheath strands (3) each formed by twisting together plural steel filaments are twisted together around at least one core strand (2) formed by twisting together plural steel filaments. Core strand (2) and sheath strands (3) are each formed by twisting together one or two core filaments (2c) and (3c) and plural sheath filaments (2s) and (3s), respectively, and a relationship represented by the following Formula (1) is satisfied when a wire diameter of core filament(s) (2c) of core strand (2), a wire diameter of sheath filaments (2s), a wire diameter of core filaments (3c) of sheath strands (3), and a wire diameter of sheath filaments (3s) are defined as dcc, dcs, dsc and dss, respectively: dcc>dcs≥dsc>dss (1).

18 Claims, 3 Drawing Sheets

A : long axial of the core strand
B : short axial of the core strand
C : long axial of the sheath strand
D : short axial of the sheath strand

(52) U.S. Cl.
CPC ............... *D07B 2201/2006* (2013.01); *D07B 2201/2011* (2013.01); *D07B 2205/3025* (2013.01); *D07B 2205/3071* (2013.01); *D07B 2205/3089* (2013.01)

(56) References Cited

U.S. PATENT DOCUMENTS

| | | | |
|---|---|---|---|
| 5,946,898 A | 9/1999 | Kurata et al. | |
| 6,295,799 B1* | 10/2001 | Baranda | B66B 7/062 57/221 |
| 6,560,807 B1* | 5/2003 | Stubler | D07B 1/068 14/22 |
| 2002/0005036 A1 | 1/2002 | Kim | |
| 2003/0106300 A1 | 6/2003 | Bruyneel et al. | |
| 2004/0020578 A1 | 2/2004 | Sinopoli et al. | |
| 2011/0209808 A1 | 9/2011 | Nakamura | |
| 2012/0175035 A1 | 7/2012 | Toussain et al. | |
| 2012/0211310 A1* | 8/2012 | Peric | B66B 7/062 187/254 |
| 2012/0267025 A1* | 10/2012 | Daghini | B60C 9/0007 152/527 |
| 2017/0114497 A1 | 4/2017 | Liu et al. | |
| 2017/0210170 A1 | 7/2017 | Nozaki | |
| 2017/0211229 A1 | 7/2017 | Nozaki | |
| 2017/0232798 A1 | 8/2017 | Suzuki | |
| 2020/0308763 A1* | 10/2020 | Nozaki | D07B 1/0626 |

FOREIGN PATENT DOCUMENTS

| | | |
|---|---|---|
| CN | 102216519 A | 10/2011 |
| CN | 102975422 A | 3/2013 |
| CN | 203373487 U | 1/2014 |
| EP | 3133205 A1 | 2/2017 |
| GB | 2 063 725 A | 6/1981 |
| JP | 54-53481 A | 4/1979 |
| JP | 55-93706 A | 7/1980 |
| JP | 56-86639 A | 7/1981 |
| JP | 6-173179 A | 6/1994 |
| JP | 8-284079 A | 10/1996 |
| JP | 2003-532808 A | 11/2003 |
| JP | 2004-58999 A | 2/2004 |
| JP | 2007-107136 A | 4/2007 |
| JP | 2009-108460 A | 5/2009 |
| JP | 2011-202291 A | 10/2011 |
| JP | 2016-30863 A | 3/2016 |
| JP | 2016-69774 A | 5/2016 |
| WO | 2011/000950 A2 | 1/2011 |
| WO | 2016/017654 A1 | 2/2016 |

OTHER PUBLICATIONS

Chinese Search Report dated Jul. 2, 2021 by the Chinese Patent Office in Chinese Application No. 201880042677.8.
International Search Report for PCT/JP2018/024702 dated Oct. 2, 2018 [PCT/ISA/210].

* cited by examiner

A : long axial of the core strand
B : short axial of the core strand
C : long axial of the sheath strand
D : short axial of the sheath strand

RUBBER COMPONENT REINFORCING-STEEL CORD

The present Application is a continuation of International Application No. PCT/JP2018/024702 filed Jun. 28, 2018, and claims priority to Japanese Application No. JP2017-129979 filed Jun. 30, 2017, the disclosures of which are incorporated herein by reference.

TECHNICAL FIELD

The present invention relates to a rubber article-reinforcing steel cord (hereinafter, also simply referred to as "steel cord"), more particularly a rubber article-reinforcing steel cord in which the corrosion resistance is improved without an increase in weight.

BACKGROUND ART

In rubber articles such as conveyor belts and tires, steel cords obtained by twisting together plural steel filaments (hereinafter, also simply referred to as "filaments") are generally used as reinforcing materials. Many proposals have been made on such steel cords.

For example, Patent Document 1 proposes a steel cord having a multi-twisted structure in which two core filaments are used in a core strand and the diameter of outermost-layer sheath filaments of each sheath strand is controlled to be larger than the diameter of a filament inside the outermost-layer sheaths of the sheath strand, whereby the cut resistance is improved while avoiding an increase in the diameter and the weight of the steel cord. In addition, Patent Document 2 proposes a steel cord having a multi-twisted structure in which a ratio (dc/ds) between the diameter (dc) of sheath filaments of a core strand and the diameter (ds) of outermost-layer sheath filaments of sheath strands is controlled to be higher than 1.25 but 1.50 or lower, whereby the cut resistance is improved while maintaining the amount of steel. Further, Patent Document 3 proposes a steel cord having a multi-twisted structure in which plural strands each having a layer-twisted structure composed of a core formed by two or three core filaments and at least one sheath layer are twisted together, wherein gaps between filaments constituting the outermost-layer sheaths of the strands are controlled to be 0.5 to 4.0% of the diameter of outermost-layer sheath filaments 13 and the occurrence of premature breakage of an outermost layer filament is thereby inhibited.

Still further, Patent Document 4 proposes a steel cord composed of a single core strand having a layer-twisted structure and plural sheath strands each having a layer-twisted structure, in which the average size of gaps between outermost-layer sheath filaments of the core strand is controlled to be 0.073 to 0.130 mm and the number of the outermost-layer sheath filaments is set at 7 to 10, whereby the rust resistance, the cord strength and the shear resistance are improved. Moreover, Patent Document 5 proposes a steel cord having a (2+M+N) structure in which filaments having a prescribed wire diameter are used in each layer and twisted together at a prescribed twist pitch and the amount of a filling rubber is controlled at a prescribed level, whereby the productivity and the fatigue-corrosion resistance are improved. Furthermore, Patent Document 6 proposes a steel cord obtained by twisting together plural strands each having outermost layer filaments and inner filaments, in which the adhesion with rubber is improved by performing a brass plating treatment on the outermost layer filaments of each outermost layer strand constituting an outer circumferential part and performing a zinc plating treatment on at least one filament positioned on the inner side than the outermost layer strand.

RELATED ART DOCUMENTS

Patent Documents

[Patent Document 1] JP 2016-69774 A
[Patent Document 2] JP 2016-30863 A
[Patent Document 3] JP 2009-108460 A
[Patent Document 4] WO 2016/017654
[Patent Document 5] WO 2011/000950
[Patent Document 6] JP 2011-202291 A

SUMMARY OF THE INVENTION

Problems to be Solved by the Invention

Steel cords for conveyor belts are usually plated with zinc. The reason for this is because, even when rainwater or the like reached filaments through a cut or the like generated on a conveyor belt by an article being conveyed, corrosion of the filaments can be delayed by allowing the plated zinc to corrode preferentially to the filaments. However, even without such zinc plating, water does not reach the filaments in the first place as long as a rubber has infiltrated to the interior of the steel cord (this property is hereinafter also referred to as "rubber penetration"), which is preferred in terms of corrosion resistance.

However, the easiness of a rubber to infiltrate into the interior of the steel cord means that the steel cord has large gaps therein and, in this case, the occupancy of the filaments with respect to the cord circumscribed circle is reduced, resulting in a corresponding reduction in the strength. Accordingly, the filament diameter is increased in order to ensure the strength; however, this leads to deterioration of the rubber penetration and an increase in the cord weight. Conventionally, these problems have not been sufficiently examined for steel cords having a multi-twisted structure, and there is still room for further improvement.

In view of the above, an object of the present invention is to provide a rubber article-reinforcing steel cord in which the corrosion resistance is improved without an increase in weight.

Means for Solving the Problems

The present inventor intensively studied to solve the above-described problems and consequently discovered that the problems can be solved by controlling the diameters of filaments constituting a steel cord having a multi-twisted structure to satisfy a prescribed relationship, thereby completing the present invention.

That is, the rubber article-reinforcing steel cord according to the present invention is a rubber article-reinforcing steel cord in which plural sheath strands each formed by twisting together plural steel filaments are twisted together around at least one core strand formed by twisting together plural steel filaments, the rubber-article-reinforcing cord being characterized in that the core strand and the sheath strands are each formed by twisting together one or two core filaments and plural sheath filaments, and a relationship represented by the following Formula (1) is satisfied when a wire diameter of the core filament(s) of the core strand, a wire diameter of the sheath filaments of the core strand, a wire diameter of the core filaments of the sheath strands, and a wire diameter of the sheath filaments of the sheath strands are defined as dcc, dcs, dsc and dss, respectively:

$$dcc > dcs \geq dsc > dss \quad (1).$$

In the steel cord of the present invention, it is preferred that a relationship represented by the following Formula (2) be satisfied when a tensile strength of the core filament(s) of the core strand, a tensile strength of the sheath filaments of the core strand, a tensile strength of the core filaments of the sheath strands, and a tensile strength of the sheath filaments of the sheath strands are defined as Tcc, Tcs, Tsc and Tss, respectively:

$$Tss > Tsc \geq Tcs > Tcc \quad (2).$$

In the steel cord of the present invention, it is also preferred that the steel filaments have a tensile strength T (MPa) satisfying a relationship represented by the following formula:

$$(-2{,}000 \times d + 3{,}825) \leq T < (-2{,}000 \times d + 4{,}525).$$

Further, in the steel cord of the present invention, it is preferred that the steel filaments have a diameter (d) of 0.3 to 0.8 mm. Yet still further, in the steel cord of the present invention, it is preferred that an average gap between adjacent sheath filaments in the same sheath filament layer of the core strand be 35 to 76 μm, and that an average gap between adjacent sheath filaments in the same sheath filament layer of the sheath strands be 20 to 76 μm.

Yet still further, in the steel cord of the present invention, it is preferred that the core filaments of the core strand and the sheath strands be not twisted, and that the core strand and the sheath strands have a short axis/long axis ratio of 0.7 to 0.85 in a cross-sectional view taken along a direction perpendicular to the longitudinal direction of the strands. Yet still further, in the steel cord of the present invention, the core strand and the sheath strands have a (2+m) structure or a (2+m+n) structure, and these strands can be suitably applied to a steel cord wherein m=8 to 9 and n=14 to 15. Yet still further, in the steel cord of the present invention, it is preferred that, when the core strand includes two or more sheath filament layers, the diameter (dcs) of the sheath filaments be smaller in the sheath filament layers on the strand radial-direction outer side, and that, when the sheath strands each include two or more sheath filament layers, the diameter (dss) of the sheath filaments be smaller in the sheath filament layers on the strand radial-direction outer side.

Yet still further, in the steel cord of the present invention, it is preferred that, when the core strand and the sheath strands each include two or more sheath filament layers, an average gap between adjacent sheath filaments of a sheath filament layer on the strand radial-direction outer side be larger than an average gap between adjacent sheath filaments of a sheath filament layer on the strand radial-direction inner side. Yet still further, in the steel cord of the present invention, it is preferred that a ratio between a long axis of the sheath strands and that of the core strand (long axis of sheath strands:long axis of core strand) be 100:105 to 130. Yet still further, it is preferred that the steel cord of the present invention have a short axis/long axis ratio of 0.80 to 0.95 in a cross-sectional view taken along a direction perpendicular to the longitudinal direction of the steel cord.

Yet still further, in the steel cord of the present invention, it is preferred that brass plating and zinc plating be sequentially performed on the steel filaments. Yet still further, in the steel cord of the present invention, it is preferred that, when the diameter of the steel filaments is defined as d, an amount (g/m$^2$) of the brass plating adhered to the steel filaments be 6d to 10d, and an amount (g/m$^2$) of the zinc plating adhered to the steel filaments be 25d to 95d. The steel cord of the present invention can be suitably used for reinforcing a conveyor.

Effects of the Invention

According to the present invention, a rubber article-reinforcing steel cord in which the corrosion resistance is improved without an increase in weight can be provided.

MODE FOR CARRYING OUT THE INVENTION

Figure 1:
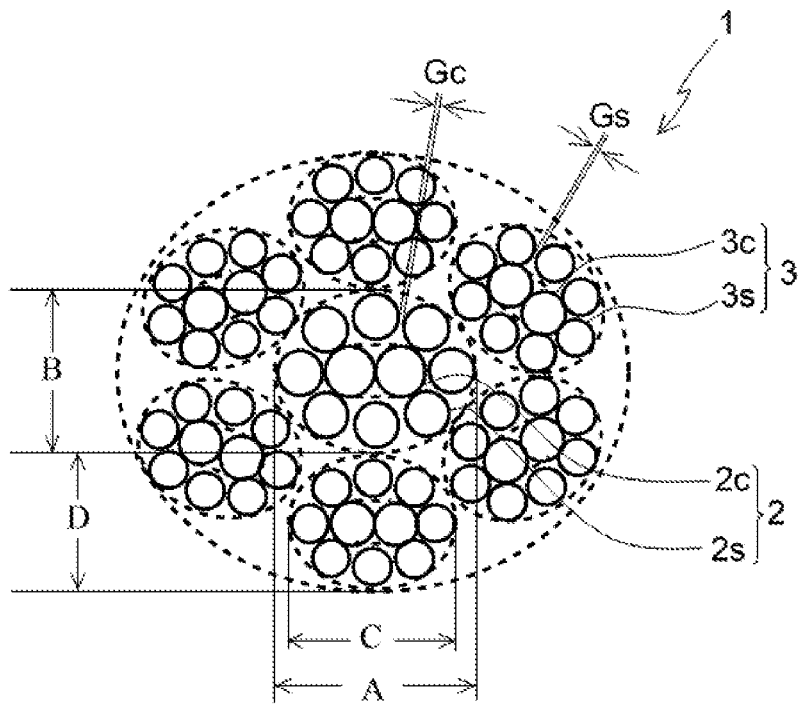
FIG. 1 is a cross-sectional view illustrating a rubber article-reinforcing steel cord according to one preferred embodiment of the present invention.

The rubber article-reinforcing steel cord of the present invention will now be described in detail referring to the drawings. FIG. 1 is a cross-sectional view illustrating a rubber article-reinforcing steel cord according to one preferred embodiment of the present invention. A steel cord 1 of the present invention has a multi-twisted structure in which plural sheath strands 3 each formed by twisting together plural filaments are twisted together around at least one core strand 2 formed by twisting together plural filaments. The core strand 2 and the sheath strands 3 are each formed by twisting together one or two core filaments and plural sheath filaments. The illustrated steel cord 1 has a (2+8)+6×(2+8) structure in which six sheath strands 3 are twisted together around a single core strand 2, and the core strand 2 and the sheath strands 3 are each composed of a core in which two core filaments 2c or 3c are parallelly aligned without being twisted together, and eight sheath filaments 2s or 3s that are twisted together around the core.

In the steel cord 1 of the present invention, the reason why each core of the core strand 2 and the sheath strands 3 is constituted by one or two core filaments is because, when the core is constituted by three or more core filaments, corrosion resistance cannot be obtained in some cases since gaps into which a rubber does not infiltrate are formed inside the core.

In the steel cord 1 of the present invention, a relationship represented by the following Formula (1) is satisfied when a wire diameter of the core filaments 2c of the core strand 2, a wire diameter of the sheath filaments 2s of the core strand 2, a wire diameter of the core filaments 3c of the sheath strands 3, and a wire diameter of the sheath filaments 3s of the sheath strands 3 are defined as dcc, dcs, dsc and dss, respectively:

$$dcc > dcs \geq dsc > dss \quad (1).$$

In other words, the rubber penetration is improved by reducing the diameter of the filaments constituting the steel cord 1 toward the cord radial-direction outer side.

In the steel cord of the present invention, when the core strand and the sheath strands each have two sheath filament layers, a relationship represented by the following Formula (3) (wherein, a wire diameter of a first sheath filament of the core strand is dcs1, a wire diameter of a second sheath filament of the core strand is dcs2, a wire diameter of a first sheath filament of the sheath strands is dss1, and a wire diameter of a second sheath filament of the sheath strands is dss2) is satisfied:

$$dcc > dcs1 > dcs2 \geq dsc > dss1 > dss2 \quad (3).$$

When either the core strand or each sheath strand has two sheath filament layers, the dcs2 or the dss2 of the stand having a single sheath filament layer can be excluded from the above-described Formula (3).

In the steel cord 1 of the present invention, it is preferred that a relationship represented by the following Formula (2) be satisfied when a tensile strength of the core filaments 2c of the core strand 2, a tensile strength of the sheath filaments 2s of the core strand 2, a tensile strength of the core filaments 3c of the sheath strands 3, and a tensile strength of the sheath filaments 3s of the sheath strands 3 are defined as Tcc, Tcs, Tsc and Tss, respectively:

$$Tss > Tsc \geq Tcs > Tcc \quad (2).$$

In other words, the tensile strength T of the filaments constituting the steel cord 1 increases toward the cord radial-direction outer side. When a bending input is applied to the steel cord 1, a larger input is added to a filament positioned on the cord radial-direction outer side. Therefore, in the steel cord 1 of the present invention, the fatigue durability is improved by increasing the tensile strength T of the filaments constituting the steel cord 1 toward the cord radial-direction outer side.

In the steel cord 1 of the present invention, it is preferred that the steel filaments have a tensile strength T (MPa) satisfying a relationship represented by the following formula:

$$(-2{,}000 \times d + 3{,}825) \leq Ts < (-2{,}000 \times d + 4{,}525).$$

By controlling the tensile strength T to be (−2,000×d+3,825) or higher, a weight reduction effect can be obtained and, since such a tensile strength T allows the use of fine filaments, the resistance to repeated bending fatigue is improved. On the other hand, a tensile strength T of (−2,000×d+4,525) or higher may impair the drawability and thus present a problem in terms of the filament productivity. In the steel cord 1 of the present invention, the filaments preferably have a diameter (d) in a range of 0.3 to 0.8 mm. The reason for this is because, when the diameter (d) of the filaments is less than 0.3 mm, the required strength cannot be attained in some cases, whereas when the diameter (d) is greater than 0.8 mm, the required tensile strength cannot be attained in some cases.

In the steel cord 1 of the present invention, it is preferred that an average gap Gc between adjacent sheath filaments 2s in the same sheath filament layer of the core strand 2 be 35 to 76 μm, and that an average gap Gs between adjacent sheath filaments 3s in the same sheath filament layer of the sheath strands 3 be 20 to 76 μm. When the average gaps Gc and Gs between the sheath filaments 2s and 3s, respectively, are smaller than the above-described respective ranges, a rubber is unlikely to infiltrate into the steel cord 1, which is not preferred. Meanwhile, when the average gaps Gc and Gs between the sheath filaments 2s and 3s, respectively, are larger than the above-described respective ranges, the ratio of steel in the cord circumscribed circle is reduced, as a result of which the cord strength is reduced. Accordingly, it is necessary to increase the filament diameter in order to ensure the cord strength; however, this leads to an increase in the cord diameter and the gauge thickness of a coating rubber, which is disadvantageous in terms of lightweightness.

Further, in the steel cord 1 of the present invention, it is preferred that, as illustrated in FIG. 1, the core filaments 2c and 3c of the core strand 2 and the sheath strands 3 be not twisted, and the core strand 2 and the sheath strands 3 have a short axis/long axis ratio of 0.7 to 0.85 in a cross-sectional view taken along a direction perpendicular to the longitudinal direction of the strands. In other words, the cross-sections of the strands are flattened in the direction perpendicular to the longitudinal direction. When the short axis/long axis ratio is lower than 0.7, since the gaps Gc and Gs between sheath filaments in the same sheath filament layer are reduced, the rubber penetration is deteriorated. Meanwhile, when the short axis/long axis ratio is higher than 0.85, since the cross-sections of the strands in the direction perpendicular to the longitudinal direction are close to being circular, the cord diameter is increased, which is disadvantageous in terms of lightweightness.

Still further, in the steel cord 1 of the present invention, it is preferred that, when the core strand 2 has two or more sheath filament layers, the diameter (dcs) of the sheath filaments be smaller in the sheath filament layers on the strand radial-direction outer side. By adopting this constitution, the rubber penetration is improved and, therefore, the effects of the present invention can be favorably attained. Similarly, it is preferred that, when the sheath strands 3 each have two or more sheath filament layers, the diameter (dss) of the sheath filaments 3s be smaller in the sheath filament layers on the strand radial-direction outer side.

Yet still further, in the steel cord 1 of the present invention, it is preferred that, when the core strand and the sheath strands each have two or more sheath filament layers, an average gap between adjacent sheath filaments of a sheath filament layer on the strand radial-direction outer side be larger than an average gap between adjacent sheath filaments of a sheath filament layer on the strand radial-direction inner side. Likewise as described above, by adopting this constitution, the rubber penetration is improved and, therefore, the effects of the present invention can be favorably attained.

Moreover, in the steel cord 1 of the present invention, it is preferred that, as illustrated in FIG. 1, a ratio between a long axis of the sheath strands 3 and that of the core strand 2 (long axis of sheath strands 3:long axis of core strand 2) be 100:105 to 130. When this ratio is lower than 105, the core strand 2 and the sheath strands 3 have substantially the same diameter; therefore, the gaps between the sheath strands 3 in the same sheath strand layer are reduced, resulting in deterioration of the rubber penetration. Meanwhile, when the ratio is higher than 130, the cord diameter must be increased in order to obtain the required strength, and this leads to an increase in the gauge thickness of a coating rubber, which is disadvantageous in terms of lightweightness.

Furthermore, it is preferred that, as illustrated in FIG. 1, the steel cord 1 of the present invention have a short axis/long axis ratio of 0.80 to 0.95 in a cross-sectional view taken along a direction perpendicular to the longitudinal direction of the steel cord. When this ratio is lower than 0.80, the steel cord 1 is overly flat; therefore, the gaps between the sheath strands 3 in the same sheath strand layer are reduced, resulting in deterioration of the rubber penetration. Meanwhile, when the ratio is higher than 0.95, since the steel cord 1 is close to being circular, the gauge thickness of a coating rubber is increased, which is disadvantageous in terms of lightweightness.

In the steel cord 1 of the present invention, it is preferred that brass plating and zinc plating be sequentially performed on the filaments. This constitution allows the zinc plating to corrode preferentially to the filaments and, therefore, corrosion of the filaments can be delayed. In addition, the zinc plating does not hinder the adhesion with a rubber. For the production of such filaments, it is preferred to draw a brass-plated steel wire material into filaments and subsequently perform zinc plating thereon. The reason for this is because, when a zinc-plated steel wire material is drawn, for example, detachment of the plated zinc and abrasion of a die occur, and the productivity is thereby deteriorated. Accordingly, by performing zinc plating after the drawing step, a reduction in the drawing rate of the steel wire material is inhibited, whereby problems such as detachment of plating and abrasion of a die can be avoided. Particularly, by incorporating the zinc plating step of performing zinc plating before or after the strand twisting step, plural filaments can be simultaneously plated with zinc, which is preferred.

The zinc plating step is preferably performed by electroplating. In molten zinc plating that is common zinc plating, since a plating treatment is performed by immersing filaments in molten zinc at 450° C. or higher, the strength of the filaments is greatly reduced when the filaments have a strength of 2,500 MPa or higher. Therefore, in the production method of the present invention, this problem can be avoided by performing the zinc plating step by electroplating.

In the steel cord 1 of the present invention, it is preferred that, when a diameter of the steel filaments is defined as d, an amount (g/m$^2$) of the brass plating adhered to the steel filaments be 6d to 10d, and an amount (g/m$^2$) of the zinc plating adhered to the steel filaments be 25d to 95d. When the amount of the adhered brass plating is less than 6d, the drawability is deteriorated, which is not preferred. Meanwhile, when this amount is greater than 10d, the productivity is reduced, which is disadvantageous and thus not preferred from the standpoint of economic efficiency. Further, when the amount of the adhered zinc plating is less than 25d, the corrosion resistance may be deteriorated, which is not preferred, while an amount of greater than 95d is also not preferred since the productivity is reduced, which is disadvantageous from the standpoint of economic efficiency.

Means for performing brass plating on a steel wire material is not particularly restricted, and a brass-plated layer may be formed by sequentially plating copper and zinc and subsequently performing a thermal diffusion treatment, or by simultaneously plating copper and zinc.

In the steel cord 1 of the present invention, as long as the above-described constitutions are satisfied, other constitutions are not particularly restricted. FIGS. 2 to 5 each show a cross-sectional view of a rubber article-reinforcing steel cord according to other preferred embodiment of the present invention.

Figure 2:
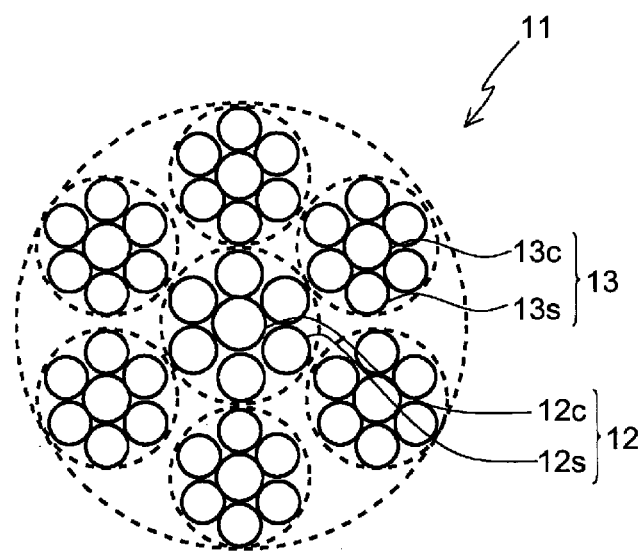
FIG. 2 is a cross-sectional view illustrating a rubber article-reinforcing steel cord according to another preferred embodiment of the present invention.
Figure 3:
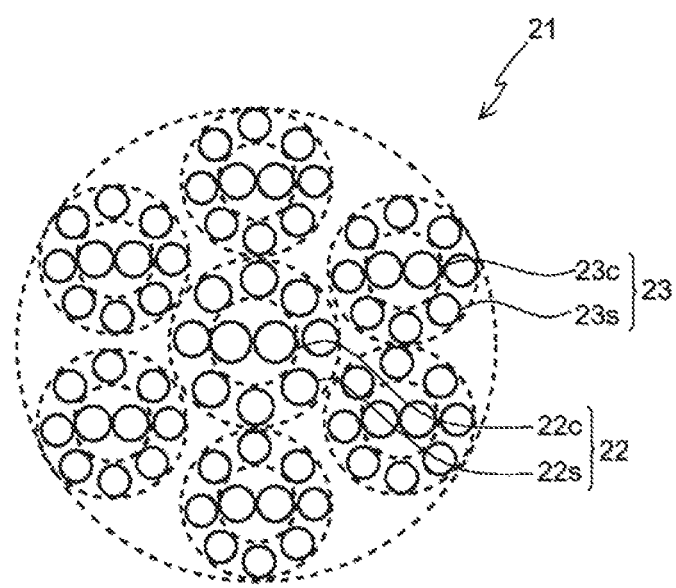
FIG. 3 is a cross-sectional view illustrating a rubber article-reinforcing steel cord according to yet another preferred embodiment of the present invention.
Figure 4:
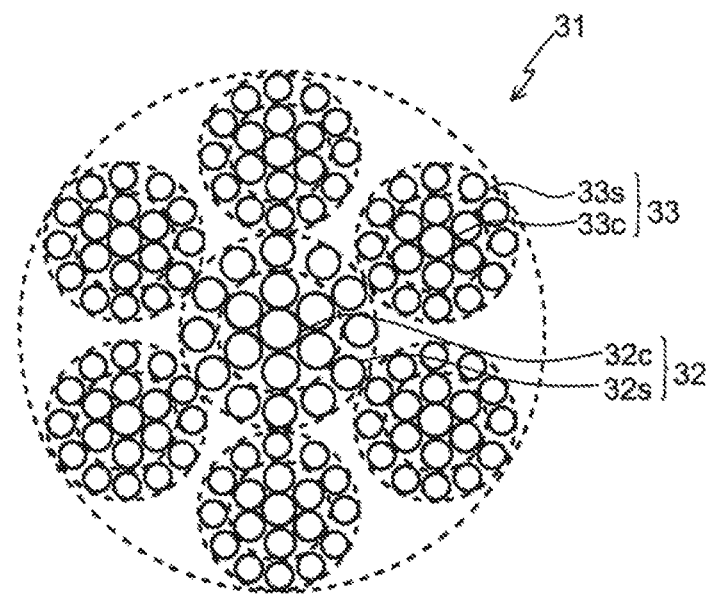
FIG. 4 is a cross-sectional view illustrating a rubber article-reinforcing steel cord according to yet another preferred embodiment of the present invention.
Figure 5:
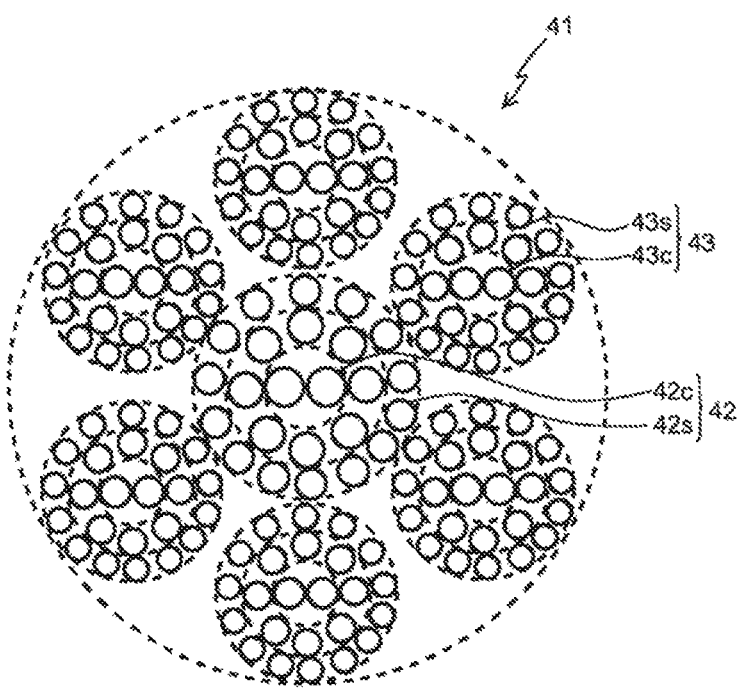
FIG. 5 is a cross-sectional view illustrating a rubber article-reinforcing steel cord according to yet another preferred embodiment of the present invention.

A steel cord 11 illustrated in FIG. 2 has a structure in which six sheath strands 13 are wound on a single core strand 12, and the core strand 12 and the sheath strands 13 are each formed by twisting together six sheath filaments 12$s$ or 13$s$ around a single core filament 12$c$ or 13$c$. A steel cord 21 illustrated in FIG. 3 has a structure in which six sheath strands 23 are wound on a single core strand 22, and the core strand 22 and the sheath strands 23 are each formed by twisting together eight sheath filaments 22$s$ or 23$s$ around a core in which two core filaments 22$c$ or 23$c$ are twisted together. A steel cord 31 illustrated in FIG. 4 has a structure in which six sheath strands 33 are wound on a single core strand 32, and the core strand 32 and the sheath strands 33 are each formed by twisting together six sheath filaments 32$s$ or 33$s$ around a single core filament 32$c$ or 33$c$, and further twisting together twelve sheath filaments 32$s$ or 33$s$ thereon. A steel cord 41 illustrated in FIG. 5 has a structure in which six sheath strands 43 are wound on a single core strand 42, and the core strand 42 and the sheath strands 43 are each formed by twisting together eight sheath filaments 42$s$ or 43$s$ around a core in which two core filaments 42$c$ or 43$c$ are twisted together, and further twisting together fourteen sheath filaments 42$s$ or 43$s$ thereon.

In the steel cord of the present invention, a (2+m) structure or a (2+m+n) structure wherein m=8 to 9 and n=14 to 15, which is capable of favorably yielding the effects of the present invention, is preferred. In the steel cord of the present invention, the twist pitch and the twist direction of the core filaments and the sheath filaments that constitute the respective strands can be selected as appropriate in accordance with a conventional method. Further, the twist direction, the twist pitch and the like of the strands are also not particularly restricted and can be selected as appropriate in accordance with a conventional method.

As the filaments used in the steel cord 1 of the present invention, any conventionally used filaments can be selected; however, the filaments are preferably made of a high-carbon steel containing not less than 0.80% by mass of a carbon component. By using a high-hardness and high-carbon steel containing not less than 0.80% by mass of a carbon component as the material of the filaments, an effect of reinforcing a rubber article, such as a tire or a conveyer belt, can be sufficiently obtained. Meanwhile, a carbon component content of higher than 1.5% is not preferred since it reduces the ductility and the fatigue resistance is thereby deteriorated.

The use of the steel cord 1 of the present invention is not particularly restricted, and the steel cord 1 of the present invention can be widely used in a variety of rubber products and components, for example, automobile tires and industrial belts such as dynamic transmission belts and conveyor belts, as well as rubber crawlers, hoses, and seismic isolation rubber bearings. Thereamong, the steel cord 1 of the present invention can be particularly suitably used as a reinforcing material of a conveyor belt that is likely to sustain a cut damage.

EXAMPLES

The present invention will now be described in more detail by way of Examples thereof. The examples, comparative examples, and the conventional example include measured values and prophetic values. The value of Rubber Penetration of Comparative Example 2 is actually measured value. The value of Rubber Penetration of Comparative Examples 1, 3 and Conventional Example are prophetic examples. The values of Rubber Penetration, Corrosion Resistance, and Resistance to Repeated Bending Fatigue of Examples 1-4 are actually measured values. The values of Rubber Penetration, Corrosion Resistance, and Resistance to Repeated Bending Fatigue of Examples 5-9 are prophetic examples. The values of Corrosion Resistance, and Resistance to Repeated Bending Fatigue of Conventional Example and Comparative Examples 1-3 are prophetic example. The values of Cord Weight are all prophetic examples.

Conventional Example, Comparative Examples 1 to 3 and Examples 1 to 9

Steel cords having the respective structures shown in Tables 1 to 4 is/were produced. As a steel wire material, one having a wire diameter of 1.86 to 2.62 mm that was obtained by drawing and patenting a piano wire rod having a diameter of 5.5 mm and a carbon content of 0.82% by mass is/was used. This steel wire material is/was drawn again to obtain filaments having various wire diameters. Thereafter, the thus obtained filaments are/were twisted together to form strands, and these strands are/were plated with zinc by electroplating and further twisted together to obtain a steel cord. In Example 4, the steel wire material is patented and then plated with copper and zinc, followed by thermal diffusion and brass plating, after which the steel wire material is drawn again to obtain filaments having prescribed wire diameters. The thus obtained filaments are subsequently twisted together to form strands, and these strands are plated with zinc by electroplating and further twisted together to obtain a steel cord.

For each of the thus obtained steel cords, the rubber penetration, the corrosion resistance, the cord weight, and the resistance to repeated bending fatigue are/were evaluated. The rubber penetration, the corrosion resistance, the cord weight, and the resistance to repeated bending fatigue are/were tested by the below-described methods.
<Rubber Penetration>
The steel cords are/were each embedded in an unvulcanized rubber and subsequently vulcanized at 145° C. for 45 minutes to prepare an evaluation sample, and the state of rubber infiltration is/was evaluated by observing a cross-section of the steel cord in the sample. An evaluation of "○" was given when the rubber infiltrated into the central part of the core strand, while an evaluation of "×" was given when the rubber did not infiltrate into the central part of the core strand. The results thereof are also shown in Tables 1 to 4.
<Corrosion Resistance Test>
The steel cords are/were each arranged in parallel to one another at intervals of 2.0 mm and subsequently coated with a rubber sheet from both above and below, and the resultant is/was vulcanized at 145° C. for 40 minutes to prepare an evaluation sample. From the thus obtained sample, a steel cord cut at a length of 200 mm is/was taken out and then immersed in a neutral aqueous solution containing nitrate ions and sulfate ions in small amounts. A bending stress of 300 N/mm$^2$ is/was repeatedly applied to the steel cord at a rate of 1,000 rotations/minute, and the number of rotations required for breaking the steel cord is/was measured. The number of rotations is/was measured up to 1,000,000. The thus obtained results are/were indicated as indices, taking the value measured for the steel cord of Example 1 as 100. The results thereof are also shown in Tables 1 to 4.
<Cord Weight>
The weight of each steel cord is calculated and indicated as an index, taking that of the steel cord of Example 1 as 100. The obtained values thereof are also shown in Tables 1 to 4.
<Resistance to Repeated Bending Fatigue>
The steel cords are/were each arranged in parallel to one another at intervals of 2.0 mm and subsequently coated with a rubber sheet from both above and below, and the resultant is/was vulcanized at 145° C. for 40 minutes. For a sample prepared by cutting out a bundle of three cords after the vulcanization, a fatigue test where the sample is/was passed through a pulley of 50 mm in diameter and driven vertically with a tension of 8.0% of the cord strength being applied is/was conducted, and the number of the repeated vertical movements required for breaking the sample is/was measured and indicated as an index, taking the value measured for the steel cord of Example 1 as 100. The results thereof are also shown in Tables 1 to 4.

TABLE 1

| | | | | Conventional Example 1 | Comparative Example 1 | Comparative Example 2 | Comparative Example 3 |
|---|---|---|---|---|---|---|---|
| Cord structure | | | | (1 + 6) + 6 × (1 + 6) | (1 + 6) + 6 × (1 + 6) | (2 + 8) + 6 × (2 + 8) | (3 + 8) + 6 × (3 + 8) |
| Core strand | | Core filament | Wire diameter (mm) | 0.66 | 0.54 | 0.66 | 0.66 |
| | | | Tensile strength (MPa) | 2,550 | 2,550 | 2,550 | 2,550 |
| | | Sheath filament | Wire diameter (mm) | 0.66 | 0.59 | 0.66 | 0.59 |
| | | | Tensile strength (MPa) | 2,550 | 2,550 | 2,550 | 2,550 |
| Sheath strand | | Core filament | Wire diameter (mm) | 0.66 | 0.59 | 0.66 | 0.59 |
| | | | Tensile strength (MPa) | 2,550 | 2,550 | 2,550 | 2,550 |
| | | Sheath filament | Wire diameter (mm) | 0.66 | 0.66 | 0.66 | 0.54 |
| | | | Tensile strength (MPa) | 2,550 | 2,550 | 2,550 | 2,550 |

TABLE 1-continued

|  |  | Conventional Example 1 | Comparative Example 1 | Comparative Example 2 | Comparative Example 3 |
|---|---|---|---|---|---|
| Gap between sheath filaments*[1] (μm) | Core strand | 0 | 25 | 98 | 180 |
|  | Sheath strand | 0 | 35 | 98 | 153 |
| Short axis/long axis of strand*[2] |  | 0.99 | 0.98 | 0.95 | 0.99 |
| Long axis of core strand/long axis of sheath strand × 100 |  | 100 | 90 | 100 | 111 |
| Short axis/long axis of steel cord |  | 0.99 | 0.96 | 0.97 | 0.99 |
| Amount of brass plating |  | 0 | 0 | 0 | 0 |
| Amount of zinc plating |  | 65 d | 65 d | 65 d | 65 d |
| Rubber penetration |  | x | x | ○ | x |
| Corrosion resistance (index), higher is better |  | 75 | 80 | 95 | 85 |
| Cord diameter (mm), smaller is better |  | 5.7 | 5.3 | 7.9 | 7.3 |
| Cord weight (index), smaller is better |  | 141 | 133 | 202 | 161 |
| Resistance to repeated bending fatigue (index), higher is better |  | 68 | 85 | 90 | 95 |

*[1]average gap between adjacent sheath filaments
*[2](average of core strand(s) and sheath strands)

TABLE 2

|  |  |  | Example 1 | Example 2 | Example 3 | Example 4 |
|---|---|---|---|---|---|---|
| Cord structure |  |  | (1 + 6) + 6 × (1 + 6) | (2 + 8) + 6 × (2 + 8) | (2 + 8 + 14) + 6 × (2 + 8 + 14) | (2 + 8) + 6 × (2 + 8) |
| Core strand | Core filament | Wire diameter (mm) | 0.66 | 0.505 | 0.6 | 0.505 |
|  |  | Tensile strength (MPa) | 2,536 | 3,087 | 2,751 | 3,087 |
|  | Sheath filament | Wire diameter (mm) | 0.59 | 0.445 | 0.54/0.48 | 0.445 |
|  |  | Tensile strength (MPa) | 2,834 | 3,334 | 3,334/3,567 | 3,334 |
| Sheath strand | Core filament | Wire diameter (mm) | 0.59 | 0.445 | 0.48 | 0.445 |
|  |  | Tensile strength (MPa) | 2,834 | 3,334 | 3,186 | 3,334 |
|  | Sheath filament | Wire diameter (mm) | 0.54 | 0.395 | 0.42/0.36 | 0.395 |
|  |  | Tensile strength (MPa) | 3,087 | 3,567 | 3,447/3,576 | 3,567 |
| Gap between sheath filaments*[1] (μm) | Core strand |  | 35 | 37 | 37/76 | 37 |
|  | Sheath strand |  | 25 | 31 | 37/73 | 31 |
| Short axis/long axis of strand*[2] |  |  | 0.96 | 0.80 | 0.78 | 0.80 |
| Long axis of core strand/long axis of sheath strand × 100 |  |  | 110 | 113 | 129 | 113 |
| Short axis/long axis of steel cord |  |  | 0.95 | 0.87 | 0.85 | 0.87 |
| Amount of brass plating |  |  | 0 | 0 | 0 | 8 d |
| Amount of zinc plating |  |  | 65 d | 65 d | 65 d | 65 d |
| Rubber penetration |  |  | ○ | ○ | ○ | ○ |
| Corrosion resistance (index), higher is better |  |  | 100 | 105 | 110 | 140 |
| Cord diameter (mm), smaller is better |  |  | 5.0 | 4.8 | 7.6 | 4.8 |
| Cord weight (index), smaller is better |  |  | 100 | 79 | 188 | 79 |
| Resistance to repeated bending fatigue (index), higher is better |  |  | 100 | 103 | 130 | 120 |

TABLE 3

| | | | Example 5 (2 + 8) + 6 × (2 + 8) | Example 6 (1 + 6) + 6 × (1 + 6) | Example 7 (2 + 8) + 6 × (2 + 8) |
|---|---|---|---|---|---|
| | | Cord structure | | | |
| Core strand | Core filament | Wire diameter (mm) | 0.505 | 0.66 | 0.575 |
| | | Tensile strength (MPa) | 3,087 | 3,087 | 2,993 |
| | Sheath filament | Wire diameter (mm) | 0.45 | 0.59 | 0.45 |
| | | Tensile strength (MPa) | 3,334 | 2,834 | 3,234 |
| Sheath strand | Core filament | Wire diameter (mm) | 0.45 | 0.59 | 0.45 |
| | | Tensile strength (MPa) | 3,334 | 2,834 | 3,234 |
| | Sheath filament | Wire diameter (mm) | 0.395 | 0.54 | 0.395 |
| | | Tensile strength (MPa) | 3,567 | 2,536 | 3,567 |
| Gap between sheath filaments*[1] (μm) | | Core strand | 34 | 35 | 77 |
| | | Sheath strand | 34 | 25 | 34 |
| | | Short axis/long axis of strand*[2] | 0.81 | 0.96 | 0.81 |
| | | Long axis of core strand/long axis of sheath strand × 100 | 113 | 110 | 121 |
| | | Short axis/long axis of steel cord | 0.88 | 0.95 | 0.88 |
| | | Amount of brass plating | 0 | 0 | 0 |
| | | Amount of zinc plating | 65d | 65d | 65d |
| | | Rubber penetration | x | ○ | ○ |
| | | Corrosion resistance (index), higher is better | 99 | 100 | 106 |
| | | Cord diameter (mm), smaller is better | 4.9 | 5.0 | 5.0 |
| | | Cord weight (index), smaller is better | 80 | 100 | 81 |
| | | Resistance to repeated bending fatigue (index), higher is better | 103 | 95 | 102 |

TABLE 4

| | | | Example 8 (2 + 8) + 6 × (2 + 8) | Example 9 (2 + 8) + 6 × (2 + 8) |
|---|---|---|---|---|
| | | Cord structure | | |
| Core strand | Core filament | Wire diameter (mm) | 0.505 | 0.55 |
| | | Tensile strength (MPa) | 3,087 | 3,322 |
| | Sheath filament | Wire diameter (mm) | 0.45 | 0.495 |
| | | Tensile strength (MPa) | 3,334 | 3,334 |
| Sheath strand | Core filament | Wire diameter (mm) | 0.45 | 0.495 |
| | | Tensile strength (MPa) | 3,334 | 3,334 |
| | Sheath filament | Wire diameter (mm) | 0.42 | 0.37 |
| | | Tensile strength (MPa) | 3,155 | 3,567 |
| Gap between sheath filaments*[1] (μm) | | Core strand | 35 | 35 |
| | | Sheath strand | 19 | 77 |
| | | Short axis/long axis of strand*[2] | 0.81 | 0.81 |
| | | Long axis of core strand/long axis of sheath strand × 100 | 110 | 121 |
| | | Short axis/long axis of steel cord | 0.88 | 0.88 |
| | | Amount of brass plating | 0 | 0 |
| | | Amount of zinc plating | 65d | 65d |
| | | Rubber penetration | x | ○ |
| | | Corrosion resistance (index), higher is better | 98 | 100 |
| | | Cord diameter (mm), smaller is better | 5.0 | 5.1 |
| | | Cord weight (index), smaller is better | 86 | 80 |
| | | Resistance to repeated bending fatigue (index), higher is better | 101 | 104 |

From Tables 1 to 4, it is seen that, in the steel cords according to the present invention, the corrosion resistance is/was improved without an increase in the weight. It is noted here, however, that, in Example 3, since the stands are/were not bilayer twisted cords but are/were three-layer twisted cords, the cord strength is/was higher and the cord diameter and the cord weight are/were larger as compared to Example 1.

DESCRIPTION OF SYMBOLS 1, 11, 21, 31, 41: steel cord
2, 12, 22, 32, 42: core strand
2c, 12c, 22c, 32c, 42c: core filament
2s, 12s, 22s, 32s, 42s: sheath filament
3, 13, 23, 33, 43: sheath strand
3c, 13c, 23c, 33c, 43c: core filament
3s, 13s, 23s, 33s, 43s: sheath filament

The invention claimed is:

1. A rubber article-reinforcing steel cord in which plural sheath strands each formed by twisting together plural steel filaments are twisted together around at least one core strand formed by twisting together plural steel filaments, wherein
the core strand and the sheath strands are each formed by twisting together one or two core filaments and plural sheath filaments, a relationship represented by the following Formula (1) is satisfied when a wire diameter of the core filament(s) of the core strand, a wire diameter of the sheath filaments of the core strand, a wire diameter of the core filaments of the sheath strands, and a wire diameter of the sheath filaments of the sheath strands are defined as dcc, dcs, dsc and dss, respectively:

$$dcc > dcs \geq dsc > dss \qquad (1), \text{ and}$$

the steel filaments have a diameter (d) of 0.3 to 0.8 mm.

2. The rubber article-reinforcing steel cord according to claim 1, wherein a relationship represented by the following Formula (2) is satisfied when a tensile strength of the core filament(s) of the core strand, a tensile strength of the sheath filaments of the core strand, a tensile strength of the core filaments of the sheath strands, and a tensile strength of the sheath filaments of the sheath strands are defined as Tcc, Tcs, Tsc and Tss, respectively:

$$Tss > Tsc \geq Tcs > Tcc \qquad (2).$$

3. The rubber article-reinforcing steel cord according to claim 2, wherein the steel filaments have a tensile strength T (MPa) satisfying a relationship represented by the following formula:

$$(-2{,}000 \times d + 3{,}825) \leq T < (-2{,}000 \times d + 4{,}525).$$

4. The rubber article-reinforcing steel cord according to claim 2, wherein
an average gap between adjacent sheath filaments in the same sheath filament layer of the core strand is 35 to 76 µm, and
an average gap between adjacent sheath filaments in the same sheath filament layer of the sheath strands is 20 to 76 µm.

5. The rubber article-reinforcing steel cord according to claim 2, wherein
when the core strand comprises two or more sheath filament layers, the diameter (dcs) of the sheath filaments is smaller in the sheath filament layers on the strand radial-direction outer side, and
when the sheath strands each comprise two or more sheath filament layers, the diameter (dss) of the sheath filaments is smaller in the sheath filament layers on the strand radial-direction outer side.

6. The rubber article-reinforcing steel cord according to claim 1, wherein the steel filaments have a tensile strength T (MPa) satisfying a relationship represented by the following formula:

$$(-2{,}000 \times d + 3{,}825) \leq T < (-2{,}000 \times d + 4{,}525).$$

7. The rubber article-reinforcing steel cord according to claim 1, wherein
an average gap between adjacent sheath filaments in the same sheath filament layer of the core strand is 35 to 76 µm, and
an average gap between adjacent sheath filaments in the same sheath filament layer of the sheath strands is 20 to 76 µm.

8. The rubber article-reinforcing steel cord according to claim 1, wherein
when the core strand comprises two or more sheath filament layers, the diameter (dcs) of the sheath filaments is smaller in the sheath filament layers on the strand radial-direction outer side, and
when the sheath strands each comprise two or more sheath filament layers, the diameter (dss) of the sheath filaments is smaller in the sheath filament layers on the strand radial-direction outer side.

9. The rubber article-reinforcing steel cord according to claim 1, wherein a ratio between a long axis of the sheath strands and that of the core strand (long axis of sheath strands:long axis of core strand) is 100:105 to 100:130.

10. The rubber article-reinforcing steel cord according to claim 1, wherein the steel filaments are brass plated and zinc plated.

11. The rubber article-reinforcing steel cord according to claim 10, wherein an amount (g/m$^2$) of the brass plating adhered to the steel filaments is 6d to 10d, and an amount (g/m$^2$) of the zinc plating adhered to the steel filaments is 25d to 95d.

12. The rubber article-reinforcing steel cord according to claim 1, which is for a conveyor.

13. A rubber article-reinforcing steel cord in which plural sheath strands each formed by twisting together plural steel filaments are twisted together around at least one core strand formed by twisting together plural steel filaments,
wherein
the core strand and the sheath strands are each formed by twisting together one or two core filaments and plural sheath filaments,
a relationship represented by the following Formula (1) is satisfied when a wire diameter of the core filament(s) of the core strand, a wire diameter of the sheath filaments of the core strand, a wire diameter of the core filaments of the sheath strands, and a wire diameter of the sheath filaments of the sheath strands are defined as dcc, dcs, dsc and dss, respectively:

$$dcc > dcs \geq dsc > dss \qquad (1),$$

the core filaments of the core strand and the sheath strands are not twisted, and
the core strand and the sheath strands have a short axis/long axis ratio of 0.7 to 0.85 in a cross-sectional view taken along a direction perpendicular to the longitudinal direction of the strands.

14. A rubber article-reinforcing steel cord in which plural sheath strands each formed by twisting together plural steel filaments are twisted together around at least one core strand formed by twisting together plural steel filaments,
wherein
the core strand and the sheath strands are each formed by twisting together one or two core filaments and plural sheath filaments,
a relationship represented by the following Formula (1) is satisfied when a wire diameter of the core filament(s) of the core strand, a wire diameter of the sheath filaments of the core strand, a wire diameter of the core filaments of the sheath strands, and a wire diameter of the sheath filaments of the sheath strands are defined as dcc, dcs, dsc and dss, respectively:

$$dcc > dcs \geq dsc > dss \qquad (1), \text{ and}$$

the core strand and the sheath strands have a (2+m) structure or a (2+m+n) structure in which m=8 to 9 and n=14 to 15.

15. A rubber article-reinforcing steel cord in which plural sheath strands each formed by twisting together plural steel filaments are twisted together around at least one core strand formed by twisting together plural steel filaments,
wherein
the core strand and the sheath strands are each formed by twisting together one or two core filaments and plural sheath filaments, a relationship represented by the following Formula (1) is satisfied when a wire diameter of the core filament(s) of the core strand, a wire diameter of the sheath filaments of the core strand, a wire diameter of the core filaments of the sheath strands, and a wire diameter of the sheath filaments of the sheath strands are defined as dcc, dcs, dsc and dss, respectively:

$$dcc > dcs \geq dsc > dss \tag{1),  and}$$

when the core strand and the sheath strands each comprise two or more sheath filament layers, an average gap between adjacent sheath filaments of a sheath filament layer on the strand radial-direction outer side is larger than an average gap between adjacent sheath filaments of a sheath filament layer on the strand radial-direction inner side.

16. A rubber article-reinforcing steel cord in which plural sheath strands each formed by twisting together plural steel filaments are twisted together around at least one core strand formed by twisting together plural steel filaments, wherein the core strand and the sheath strands are each formed by twisting together one or two core filaments and plural sheath filaments, a relationship represented by the following Formula (1) is satisfied when a wire diameter of the core filament(s) of the core strand, a wire diameter of the sheath filaments of the core strand, a wire diameter of the core filaments of the sheath strands, and a wire diameter of the sheath filaments of the sheath strands are defined as dcc, dcs, dsc and dss, respectively:

$$dcc > dcs \geq dsc > dss \tag{1),  and}$$

having a short axis/long axis ratio of 0.80 to 0.95 in a cross-sectional view taken along a direction perpendicular to the longitudinal direction of the steel cord.

17. A rubber article-reinforcing steel cord in which plural sheath strands each formed by twisting together plural steel filaments are twisted together around at least one core strand formed by twisting together plural steel filaments, wherein the core strand and the sheath strands are each formed by twisting together one or two core filaments and plural sheath filaments, a relationship represented by the following Formula (1) is satisfied when a wire diameter of the core filament(s) of the core strand, a wire diameter of the sheath filaments of the core strand, a wire diameter of the core filaments of the sheath strands, and a wire diameter of the sheath filaments of the sheath strands are defined as dcc, dcs, dsc and dss, respectively:

$$dcc > dcs \geq dsc > dss \tag{1),}$$

a relationship represented by the following Formula (2) is satisfied when a tensile strength of the core filament(s) of the core strand, a tensile strength of the sheath filaments of the core strand, a tensile strength of the core filaments of the sheath strands, and a tensile strength of the sheath filaments of the sheath strands are defined as Tcc, Tcs, Tsc and Tss, respectively:

$$Tss > Tsc \geq Tcs > Tcc \tag{2}$$

the core filaments of the core strand and the sheath strands are not twisted, and the core strand and the sheath strands have a short axis/long axis ratio of 0.7 to 0.85 in a cross-sectional view taken along a direction perpendicular to the longitudinal direction of the strands.

18. A rubber article-reinforcing steel cord in which plural sheath strands each formed by twisting together plural steel filaments are twisted together around at least one core strand formed by twisting together plural steel filaments, wherein the core strand and the sheath strands are each formed by twisting together one or two core filaments and plural sheath filaments, a relationship represented by the following Formula (1) is satisfied when a wire diameter of the core filament(s) of the core strand, a wire diameter of the sheath filaments of the core strand, a wire diameter of the core filaments of the sheath strands, and a wire diameter of the sheath filaments of the sheath strands are defined as dcc, dcs, dsc and dss, respectively:

$$dcc > dcs \geq dsc > dss \tag{1),}$$

a relationship represented by the following Formula (2) is satisfied when a tensile strength of the core filament(s) of the core strand, a tensile strength of the sheath filaments of the core strand, a tensile strength of the core filaments of the sheath strands, and a tensile strength of the sheath filaments of the sheath strands are defined as Tcc, Tcs, Tsc and Tss, respectively:

$$Tss > Tsc \geq Tcs > Tcc \tag{2), and}$$

the core strand and the sheath strands have a (2+m) structure or a (2+m+n) structure in which m=8 to 9 and n=14 to 15.

* * * * *